United States Patent [19]

Stephens

[11] 4,245,229
[45] Jan. 13, 1981

[54] OPTICAL RECORDING MEDIUM

[75] Inventor: Richard B. Stephens, New Providence, N.J.

[73] Assignee: Exxon Research & Engineering Co., Florham Park, N.J.

[21] Appl. No.: 6,599

[22] Filed: Jan. 26, 1979

[51] Int. Cl.³ ............................................ G01D 15/34
[52] U.S. Cl. ................................. 346/135.1; 346/1.1
[58] Field of Search ................................ 346/135, 1.1

[56] References Cited

U.S. PATENT DOCUMENTS

| 3,427,628 | 2/1969 | Clunis | 346/1.1 |
| 3,787,873 | 1/1974 | Sato et al. | 346/135 X |
| 3,893,127 | 7/1975 | Kaplan et al. | 346/135 X |
| 4,065,306 | 12/1977 | Ross et al. | 346/135 X |

OTHER PUBLICATIONS

Bartolini, R. A. et al., Optical Disk Systems Emerge, IEEE Spectrum, Aug. 1978, pp. 20-28.

*Primary Examiner*—George H. Miller, Jr.
*Attorney, Agent, or Firm*—D. W. Collins; P. E. Purwin

[57] ABSTRACT

An optical recording medium is disclosed which comprises a reflecting material, the surface of which is characterized by cavities of average depth D and of average spacing S such that for incident radiation of wavelength $\lambda$, S is less than about $\lambda/20$ and D is either greater than $\lambda/6$ or less than $\lambda/6$ and is capable of being altered to either less than or greater than $\lambda/6$, respectively.

In the practice of the invention, the heat from a high intensity energy source, such as a laser operating in the ultraviolet, optical or near-infrared region or a beam of electrons, softens the reflective material at the surface and, depending on the sign of the surface energy, either increases or decreases D, thus lowering or raising the reflectivity of the surface, respectively.

19 Claims, 8 Drawing Figures

OPTICAL RECORDING MEDIUM

BACKGROUND OF THE INVENTION

1. Field of the Invention

This invention relates to a technique for controlling the optical properties of material surfaces. More particularly, the present invention relates to a method for recording information by permanently altering the reflectivity of a surface with the application of heat by means of a high intensity light beam.

2. Discussion of the Prior Art

Heretofore, it is known to form optically recording media comprising a recording material upon selected portions of which a light signal having a high energy density is incident. The optical signal may be generated by a laser beam or an electron beam. The recording material may comprise a metal, such as bismuth, a dye or a resin which is thermally deformed, that is, melted or evaporated by thermal energy generated by exposure to the light signal. For example, it is known to record a laser beam or an electron beam whose amplitude has been modulated by an electric signal on a recording material which is thermally deformable. See, for example, U.S. Pat. Nos. 3,262,122 and 3,266,393 and Image Technology, pp. 31–35 (April/May 1970). It is also known to use a recording layer whose phase can be changed (see, e.g., U.S. Pat. No. 3,868,651) or which can be perforated (see, e.g., U.S. Pat. No. 4,000,334) or in which bubbles can be produced (see, e.g., U.S. Pat. No. 3,636,526). Such recording methods have the advantage of rapid processing and low cost and require no post-treatment. However, they also have low sensitivity or are degraded by many read cycles or are complicated to produce. This situation can be partially ameliorated by use of a porous substrate which has a lower thermal conductivity than a solid support; see, e.g., U.S. Pat. No. 4,032,691. Roughened surfaces have also been employed; see, e.g., Japanese Kokai 52-143838.

SUMMARY OF THE INVENTION

In accordance with the invention, an optical recording medium comprises a reflecting material, the surface of which is characterized by cavities of average depth D and of average spacing S such that for incident radiation at wavelength $\lambda$, S is less than about $\lambda/20$ and D is either greater than or less than $\lambda/6$ and is capable of being altered to either less than or greater than $\lambda/6$, resectively. In the practice of the invention, the heat from a high intensity energy source (light, X-rays, electrons, etc.) softens the reflecting material at the surface, and, depending on the sign of the surface energy, either increases or decreases D, thus lowering or raising the reflectivity of the surface, respectively. Improved sensitivity is realized over prior art optical recording media.

DETAILED DESCRIPTION OF THE INVENTION

The optical recording medium of the invention comprises a reflecting material, preferably of high reflectivity (for a smooth surface) of at least about 50% at the wavelength of incident radiation. The surface of the reflecting material is a graded, textured surface characterized by cavities (or protuberances) of average depth $D_{ref}$ and of average spacing S such that for incident radiation of wavelength $\lambda$, S is less than about $\lambda/20$ and $D_{ref}$ is greater than or less than about $\lambda/6$. As used herein, "texture" refers to the horizontal scale of a surface, while "graded" refers to the vertical scale.

When radiation from a high intensity energy source impinges on portions of the graded, textured surface, the portions of the surface irradiated soften, provided the incident radiation is substantially absorbed and not reflected. Upon softening, the value of $D_{ref}$ either increases or decreases, depending on the sign of the surface energy, thus lowering or raising the reflectivity of the surface. The value of $D_{ref}$ following irradiation of the surface is thus less than $\lambda/6$ if it was greater than $\lambda/6$ originally and vice versa.

The surface of the reflecting material may be heated by a number of energy sources, such as light (near-infrared, visible, ultraviolet), X-rays, electrons and the like, but it is preferable to use substantially the same wavelength radiation which is used to detect the recorded information. For that case, the resolution of the detector is matched to that of the recorder, and one only needs one energy source.

Preferably, the graded, textured surface of the reflecting material is covered by a material which is substantially optically transparent (i.e., transparent to the incident radiation). The optically transparent material serves to protect the graded, textured surface from contamination and may additionally provide support. The surface of the reflecting material may be graded and textured prior to applying the optically transparent coating thereto. Alternatively, a surface of the optically transparent material may be graded and textured prior to depositing the high reflectivity material thereon.

The surface of the transparent layer adjacent the reflecting layer has a rough surface whose protuberances (cavities) approximately match the cavities (protuberances) in the reflecting material such that S for the transparent surface is substantially the same as for the reflecting layer. However, $D_{tr}$ may be larger (as when the reflecting material is deposited on the rough transparent material, and the reflecting material does not completely fill in the cavities of the transparent material) or smaller than $D_{ref}$.

Figure 1:
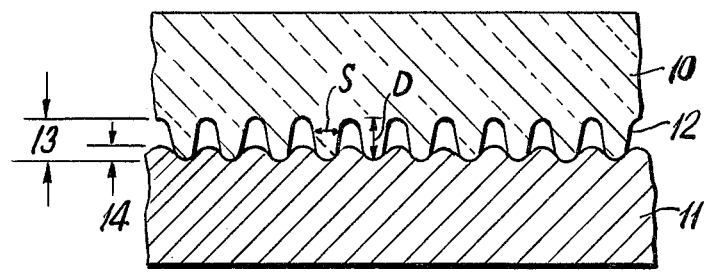
FIG. 1 is a cross-sectional view illustrating a rough surface separating an optically transparent material and a reflecting material in an as-prepared condition.

As shown in FIG. 1, the preferred configuration of the present invention comprises two layers: a top layer 10 of an optically transparent material and a bottom layer 11 of a reflecting material. In this embodiment, the surface of the transparent layer of the transparent/reflecting material interface is first textured and graded to the dimensions described above. The transparent layer also serves as the support member and is in the range of about 1/16 to ¼ inch thick. The thickness selected will depend on compromises between weight, rigidity and transparency of layer 10. It may be thinner if a substrate 20, shown in FIG. 6, supports the reflecting layer and provides the support function given by layer 10 in FIG. 1. Layer 10 may even be omitted if the interface needs no protection from mechanical or chemical contamination.

The material used in layer 10 may be an inorganic oxide glass, such as silica, or any of the number of polymers such as polystyrene known in the plastics industry which are substantially transparent at the frequency at which the light source is to operate, or other material having this property. The material may also be porous, as described in U.S. Pat. No. 4,032,691, so long as the pores are sufficiently small that they do not scatter light. An example of such a porous material is a borosilicate glass manufactured by Corning Glass Corp. under the tradename VYCOR.

In the embodiment shown in FIG. 1, the top layer also serves to define an interface 12 which has the morphology required by the wavelength of radiation used to optically record information. The surface of layer 10 at the interface is characterized by the cavities (or protuberances) of average depth $D_{tr}$ and of average spacing S.

The transparent layer serves several purposes. First, it provides mechanical protection against abrasion contaminants and, since the surface of the transparent layer is smooth, it is easily wiped clean. Second, the transparent layer provides chemical protection against reactants such as oxygen, water, oils from fingerprints and the like. Third, by judicious selection of thickness, the contrast may be enhanced. Fourth, the transparent layer may be used as a substrate to support the reflecting layer. Finally, a material that is optically transparent at the wavelength employed and having an index of refraction of less than 2 will not interfere with the reflectivity of the interface.

The rough surface morphology may be produced by any of a number of methods known to those skilled in the art, including surface etching of a homogeneous or phase separated material, particle track etching or by use of a porous substrate. Preferably, particle track etching is employed because it is potentially applicable to any dielectric material. While the radiation and chemical etching parameters have to be determined for each material, the determination is easily carried out.

During studies of the damage tracks of high energy particles in solids, investigators found that the trail of damage left by the passage of a high energy ion through a dielectric material could be etched out; see, e.g., R. L. Fleischer et al., *Nuclear Tracks in Solids*, University of California Press, 1975. Dielectric materials suitable for use in the practice of the invention are those materials having an electrical resistivity greater than about $2 \times 10^3$ ohm-cm. Examples of such materials are listed in Table 1-1, page 16 of the foregoing reference and include insulators such as silicate minerals, alkali halides, insulating glasses and polymers ($\rho = 10^6$ to $10^{20}$ ohm-cm), poor insulators such as $MoS_2$ ($\rho = 3 \times 10^3$ to $2.5 \times 10^4$ ohm-cm) and semiconductors such as $V_2O_5$ glass ($\rho = 2 \times 10^3$ to $2 \times 10^4$ ohm-cm).

By suitable adjustments in the density of the ions used to bombard a dielectric surface and by modifications of the etching procedures, a highly controlled surface morphology can be obtained. Further, this surface morphology can produce a low reflectivity surface. Such low reflectivity surfaces, of course, are useful in a variety of applications, including applications requiring transmission of energy in the near-infrared, optical and ultra-violet wavelength regimes into and/or through a transparent material. Particle track etching of a surface requires two steps. The first is the exposure of a surface to a collimated beam of high energy ions. The ions may be nuclear fission fragments or any of a number of elements well known to those skilled in the art of particle track etching. Examples of nuclear fission fragments sources included $^{235}U$, $^{232}Th$, $^{244}Pu$ and cosmic rays. Examples of other elements commonly used in particle track etching and the energies required for different materials are listed in the Fleischer reference, pp. 18–20. The elements range from hydrogen to iron to uranium fission fragments.

The particles penetrate a distance into the surface, leaving a trail or track of damaged material in their wake. By exposing the surface to a suitable etchant, conical holes or cavities, centered on each damaged track, are produced.

The distance of penetration into the surface depends on the nature of the material and the energy of the high energy radiation. The nature of the material is characterized by its absorption coefficient for the particular radiation and, as is well known, the higher the absorption coefficient, the shallower the distance of penetration. With regard to the energy of the high energy particles, it is well known that the higher the energy, the greater the depth of penetration into the material. In order to produce an effective low reflectivity surface in the ultraviolet, optical and near-infrared region (about 0.1 to 2 µm), it is necessary that the depth of penetration be more than the depth to which the surface is etched (less than about 1 µm). Particle track etching requires such high energy particles that this condition is easily met. Particular values may be selected from L. C. Northcliffe et al., "Range and Stopping Power Tables for Heavy Ions". Nuclear Data Tables A7, 233–463 (1970). For example, for 3 MeV particles of $^{16}O$, penetration in polymers to a depth of about 4 µm is obtained for polethylene and about 5 µm for Mylar. The depth of penetration appears to be relatively insensitive to polymer composition.

The ratio of etching depth to base diameter is determined by the sample material, the etchant and the etching conditions. General guidelines for etchants and conditions of etching are well known for low concentrations of damaged tracks. However, in order to obtain spacing between the tracks such that the scale S of the texture achieved when the conical cavities overlap is sufficiently small, a much higher than usual density of damage tracks is required, and, in some cases, the etchants and etching conditions must be modified for optimum results. In all cases, the etch times are drastically shortened or etchant strengths weakened, since much smaller holes are required than for conventional single track detection.

For example, the recipe for etching irradiated fused quartz (Fleischer et al., Table 2-2) calls for immersion in 28 mol % HF for one minute at room temperature. That etches too rapidly for the purposes of the present invention. Rather, a convenient etch is 10 mol % HF for 90 sec. at room temperature. Equivalently, and somewhat safer, 2.5 wt. % $NH_4HF_2$ in water for 6 min. at room temperature is also suitable. It should be noted that when the HF solution is reduced to 1 mol %, there is no observed particle track etching (it is known in some materials that the ratio of track etch rate to bulk etch depends on the etch strength; for this very weak etch, the ratio probably goes to 1). The conical cavities produced by the HF etch are about 1200 Å in diameter and 1500 Å deep, equivalent to a track to bulk etching ratio of 3.5. It would be preferable if the ratio were considerably larger; that increases D for a given S and thus increases the wavelength range of the low reflectivity window. However, a ratio of 3.5 is as good as has been achieved in silica (Fleischer et al., Table 2-3). Much sharper cones (larger ratios) can be produced in plastics, but, as will silica, the etch rate must be reduced to achieve a manageable etch time. The etch strength and temperature can typically be reduced somewhat without reducing the ratio, but there are limitations which depend on material, the proprietary additives, and the impurities in the material. For example, the polycarbonates LEXAN (tradename of General Electric, Schenectady, N.Y.) and CR-39 (available from the Homelite Corp., Wilmington, Del.) have nominally the same composition but are made by different processes. When subjected to particle track etching (prior art parameters), the LEXAN material evidences an irregular surface, while the CR-39 material evidences cleaner, sharper materials.

The spacing between cavities is determined by the density of the particles with which the samples have been bombarded. In order to use the surface as a low reflection coating for optical storage applications, the particle density ranges from about $10^{10}$ cm$^{-2}$ to $4 \times 10^{12}$ cm$^{-2}$ so that the spacing between the cavities, which determines S, is sufficiently less than the shortest wavelength of light to be absorbed (about 0.1 μm).

The depth to which the cavities may be etched is then set by the cone angle (which depends on the material, the etchant and the etching conditions) and is insensitive to etching time, because once the cones overlap, the surface achieves a steady state. The surface morphology is conveniently measured by taking transmission electron micrographs of a shadowed acetate replica of the surface.

Since the damage track left by the high energy particle is about 50 Å diameter, the minimum wavelength $\lambda_{min}$ for which this technique is applicable is about 0.1 μm. The recording and reading wavelength may thus range between about 0.1 and 10 μm.

In the case of particle track etching a surface to form a low reflectivity, highly transparent surface for optical recording applications, the cavities are preferably at least about 5 times deeper than wide at their base (this is equivalent to a track to bulk etching ratio of about 15), thereby providing a cone angle of less than about 6°. This condition is easily achieved with most plastics and minerals. The cone angles in silica and other oxide glasses are somewhat larger than in plastics and this reduces considerably the spectral width to the point that the low reflection region begins to disappear, that is, $\lambda_{min} \gtrsim \lambda_{max}$.

The values of D and S are referred to the wavelength $\lambda$ used to record and read information from the recording layer. It is preferred that S be less than about $\lambda/20$, while D be either greater than or less than about $\lambda/6$.

The value of S has to be much smaller (about an order of magnitude) than the smallest spot which will be made in recording in order for the smoothed spot to be readily distinguishable from its rough surroundings. The smallest spot diameter to which one can focus a beam of light is about $0.7\lambda$.

The value of D gives the upper limit on the low reflectivity window. The change in the optical properties are made by changing D from an initial state $D_i$ where $D_i$ is less than about $\lambda/6$, to a final state $D_f$, where $D_f$ is greater than about $\lambda/6$, or vice versa. The amount less or greater is not important. It is only important that the change in D ($D_f - D_i$) be enough to give an adequate change in reflectivity. The amount of change considered adequate will depend on the minimum signal to noise ratio desired. For example, for the indium/VYCOR system, with an increase in D of about 35%, the reflectivity changes from about 60% to about 12% for a factor of 5 in reflectivity between an irradiated spot and its surroundings. The particular values of $D_i$ and $D_f$ which can be achieved depend to a certain extent on the specific materials employed.

The reflecting layer 11 (which reflects at least about 50% for a smooth surface) may be deposited over surface 12 in many different ways. The particular manner of deposition depends on the contemplated mode of operation of the device. The value of S for the reflecting layer will be defined by the value of S of the transparent layer. However, in general, the value of D for the reflecting layer (14) will be somewhat smaller than the corresponding value for the transparent layer (13) owing to the difficulty in depositing material at the bottom of narrow cavities.

In the case that the cavities are randomly placed [a very accurate representation for structures produced by particle track etching (i.e., tracks are produced completely randomly and independently), perhaps not so accurate for other mechanisms], the probability P of a track between a distance r and dr from a particular track is $$P(r)dr = N2\pi r dr$$

where N is the number of tracks per unit area. The probability of no track in that range is, of course, 1-P(r)dr. The probability that the first neighbor lies in the range $r_o$ and $r_o + dr$ is the product $\pi$ of the probabilities that there are no tracks at $r < r_o$ times the probability that there is a track between $r_o$ and $r_o + dr$, e.g., $$P'(r_1)dr_o = \prod_{r=0}^{r_o} (1 - P(r)dr) P(r_o)dr_o$$

or, $$P'(r_o)dr_o = N2\pi r \exp(-N\pi r_o^2) dr_o$$

which is a broad peaked function (a chi square distribution with three degrees of freedom). The most probable nearest neighbor distance (equivalent to S) is $r = (\frac{1}{2}\pi N)^{\frac{1}{2}}$, the mean value for r is $(3/N\pi)^{\frac{1}{2}}$, but there is a broad distribution of such distances. This distribution has a variance of $\pm(3/N\pi)^{\frac{1}{2}}$.

The sharpness of the transition at the end of the non-reflecting window is somewhat blurred by this broad distribution. A process which produces a more uniform distribution of cavities would be preferred in cases where a quick transition is desirable. Examples of such processes include sputter-etching a surface, dendritic growth by CVD, evaporation through a residual gas, etching a phase separated surface, etching through a mask generated by interference patterns or other means, and replication of any of these surfaces.

The preceding description discloses forming an optionally transparent material having a graded, textured surface upon which a film of highly reflecting material is deposited. Preferably, the surface morphology in the transparent material is formed by particle track etching. Alternatively, a surface of the reflecting material may be graded and textured and, optionally, the optically transparent material formed thereon. There are a number of ways this latter configuration may be obtained, including vacuum evaporation of a metal film onto a substrate, sputter etching, reactive etching through a mask, chemical vapor deposition, diffusion of two metals together followed by a caustic etch, electrodeposition and reactive sputtering. This configuration is discussed below in conjunction with FIG. 6.

Figure 2:
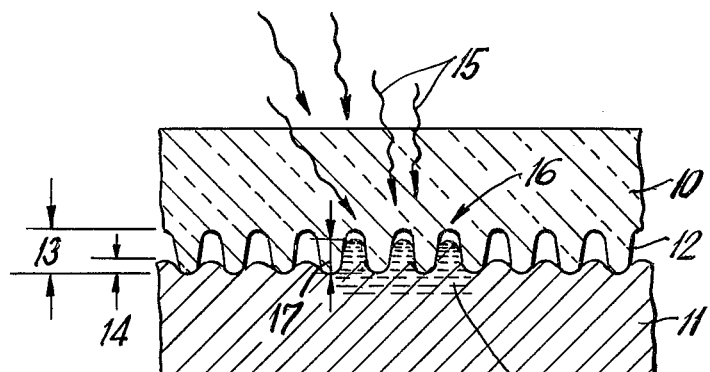
FIG. 2 is a cross-sectional view illustrating the operation of the present invention wherein the reflective layer is pulled further into the rough surface during softening by incident radiation.

There are two modes of operation for which the device of the invention may be designed. In the first, illustrated in FIG. 2, the value of D of the reflecting surface is somewhat less than $\lambda/6$ in the as-prepared state. The interfacial energy between the reflecting layer 11 and the transparent layer 10 is such that when a portion 21 of the reflecting layer is softened by heating from a concentrated light source 15, surface tension pulls that portion of the reflecting layer farther into the rough surface, as in the area shown generally at 16, so that the value of D of the reflecting material increases, as shown at 17. As one example of such a system, Corning's VYCOR borosilicate glass can be used for the optical material and indium for the reflecting material. The borosilicate glass is suitable, since, as a result of leaching out one phase, its surface is filled with 50 Å diameter pores; indium is suitable because it melts at a relatively low temperature and wets the glass surface. Capillary action then pulls the molten metal into the pores of the glass structure. In this case, the indium is deposited on the surface of the borosilicate glass in a layer having a thickness of about 100 to 10,000 Å thick. On the other hand, the simple conical hole topology of particle track etched fused quartz is preferable to the sponge topology of VYCOR because it is easier and quicker to get the metal into and out of the pores.

Figure 3:
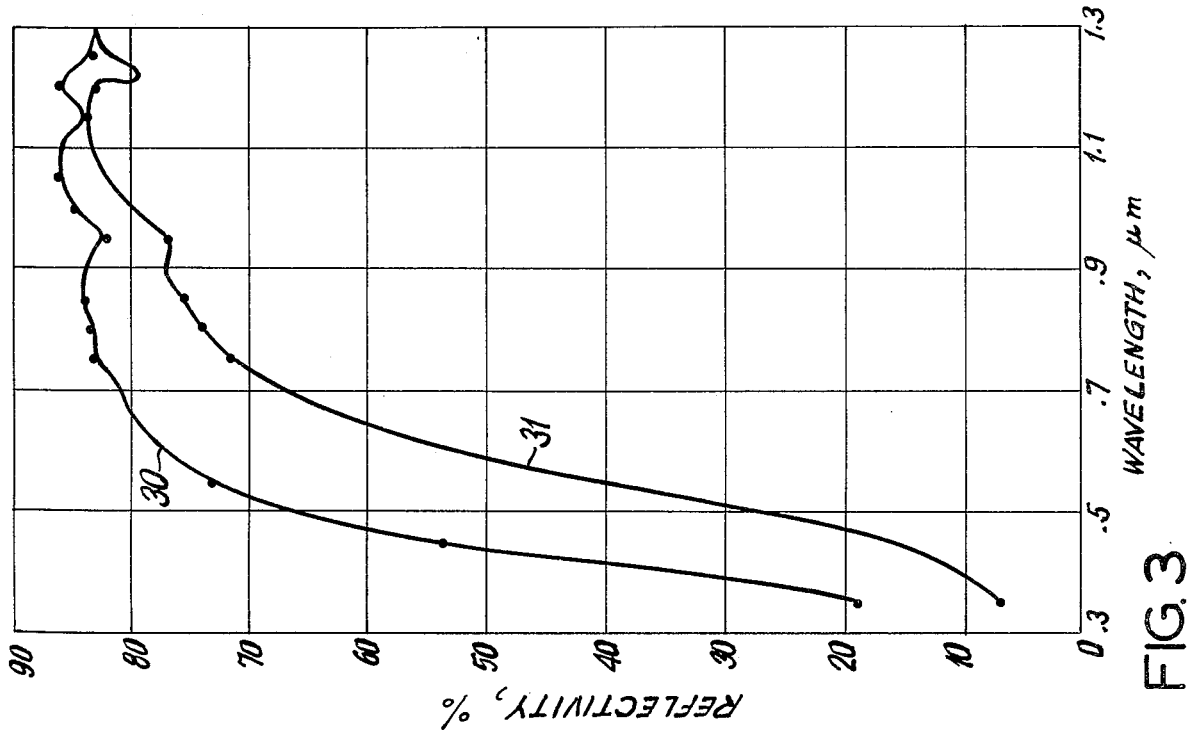
FIG. 3, on coordinates of reflectivity and wavelength, is a plot of the reflectivity of the embodiment of the present invention illustrated in FIGS. 1 and 2.

It is preferred that the reflecting layer be substantially opaque but no thicker than necessary to achieve that condition (i.e. about 1000 Å thick), since thicker layers require more power from the light source. The reflecting layer can be deposited, for example, by a vacuum evaporation onto the substrate. As prepared, the film has a reflectivity of 54% at a wavelength of 4500 Å (450 nm). After being selectively heated, however, the reflectivity of such selectively heated regions is 16% at the same wavelength. FIG. 3, which is a plot of reflectivity as a function of wavelength, depicts the reflectivity before heating (curve 30) and after heating (curve 31) indium on particle track etched fused quartz. The heating must apparently be done relatively slowly in this case. A laser pulse of 100 mJ/cm$^2$ and 0.1 $\mu$sec long either had no effect or left a shinier spot rather than a dark spot, as if the surface were being heated so much that the protuberances on the rough metal surface vaporized and recondensed on the cool metallic backing, thus reducing D.

Figure 4:
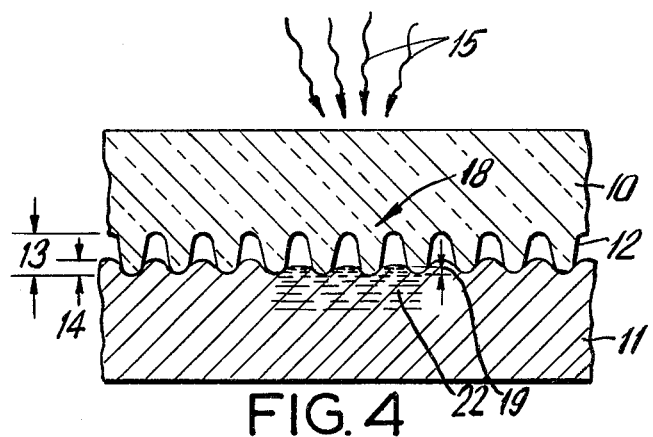
FIG. 4 is a cross-sectional view illustrating the operation of the present invention wherein the reflective layer is pushed out of the rough surface during softening by incident radiation.

An alternate mode of operation is illustrated in FIG. 4. In this case, it is preferred that the value of D of the reflecting surface be somewhat greater than $\lambda/6$ in the as-prepared state. The interfacial energy between the reflecting material 11 and the transparent material 10 is such that when a portion 22 of the reflecting layer is softened by heating with a concentrated light source 15, surface tension forces the reflecting material out of the cavities of the rough surface, as in the area generally shown at 18, so that the value of D of the reflecting material decreases, as shown at 19. As an example of such a system, particle track etched fused silica glass may be used for the transparent layer and tellurium for the reflecting layer. Tellurium is a good choice for the reflecting layer because of three desirable characteristics: (1) its high reflectivity in the visible, (2) its low melting point and (3) its low thermal diffusivity. The high reflectivity permits greater contrast between shiny spots and the background, the low melting point reduces the energy required to melt a volume of metal, and the low thermal diffusivity reduces the minimum volume of metal which can be melted. Bismuth has an even lower melting point and is also desirable as a reflective layer. It should be clear to a person skilled in the art that there are other metals and alloys which can meet these requirements also and which might be even more desirable.

Figure 5:
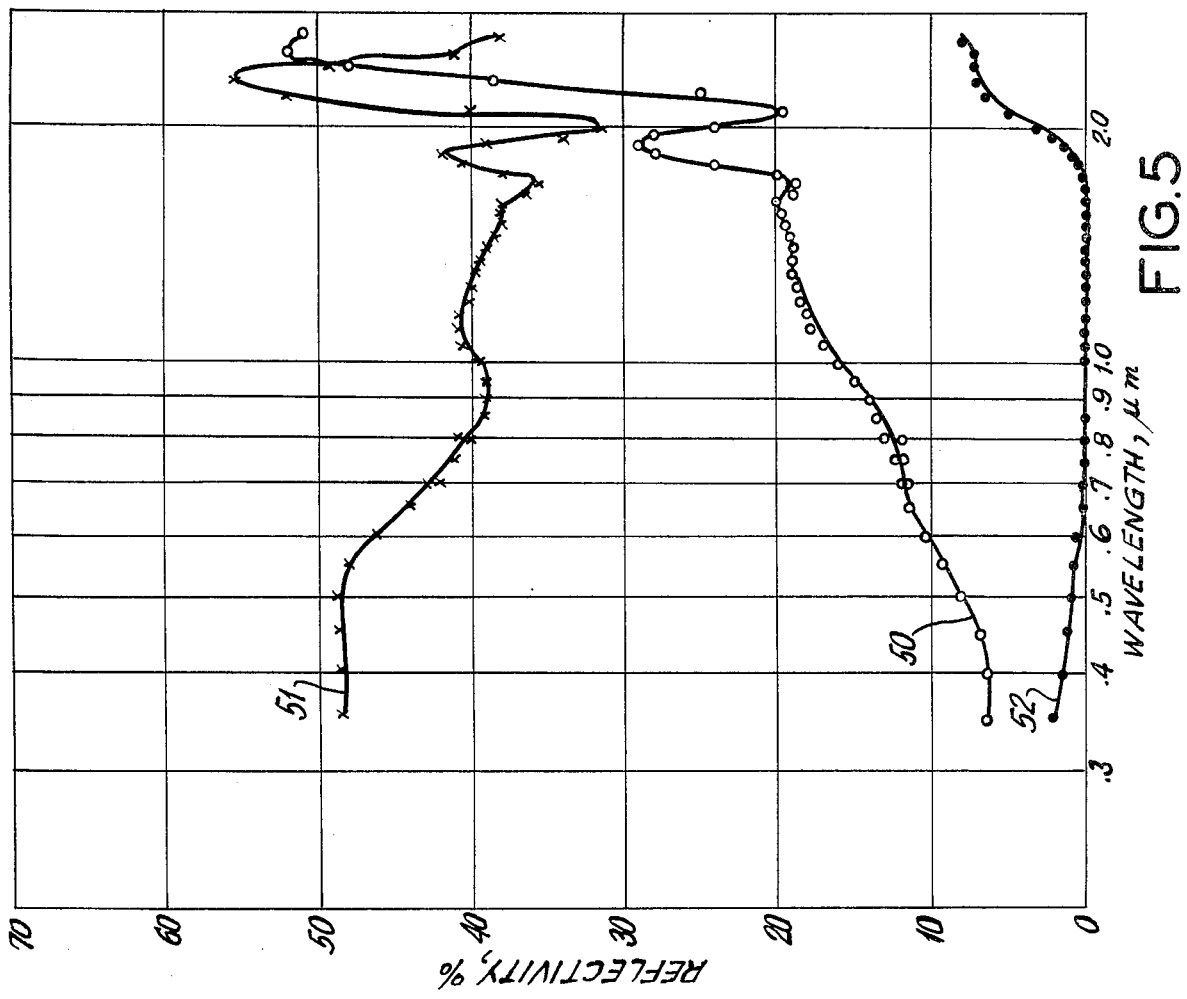
FIG. 5, on coordinates of reflectivity and wavelength, is a plot of the reflectivity of the embodiment of the present invention illustrated in FIGS. 1 and 4.

The tellurium is deposited on the glass surface in a layer greater than about 1 $\mu$m thick. The film can be deposited for example, by vacuum evaporation onto the glass surface. As prepared, the metal film has a reflectivity of 10% at wavelength of 4500 Å (0.45 $\mu$m). A laser pulse of 0.064 watt/cm$^2$ and 0.1 $\mu$sec duration at 4400 Å wavelength increases the reflectivity of the metal surface to about that of the smooth surface by visual comparison, or about 50%. FIG. 5 is a plot of reflectivity as a function of wavelength. Curve 50 depicts the rough surface reflectivity (looking through the glass to the glass/Te interface and including the reflectivity of the air/glass interface of about 4%), while curve 51 shows the smooth reflectivity of Te. The regions heated by the laser pulse are visually similar to a smooth Te surface. The diffuse reflectivity before heating is depicted by curve 52.

Figure 6:
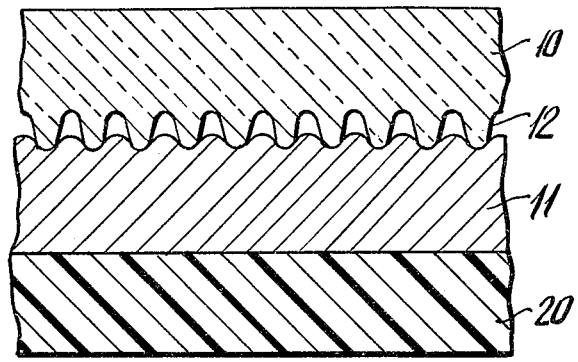
FIG. 6 is a cross-sectional view illustrating yet another embodiment of the recording device of the invention in an as-prepared condition.

Another embodiment of this mode of operation ($\lambda > 6D$) uses the configuration shown in FIG. 6. As shown there, a substrate 20 provides support for the high reflectivity material. The substrate may be of any material having sufficient rigidity to support the reflective layer and may be metallic or non-metallic. Tellurium (reflecting surface 11) is deposited onto substrate 20, as by evaporation in about 10 sec in a vacuum evaporator with a base pressure of about $4 \times 10^{-6}$ Torr onto substrate 20 maintained at 160° C. The exposed metal surface that results is rather rough; it consists of grains of metal 1000 to 2000 Å diameter slightly sintered together. In this case, the dielectric, optically transparent 10 overlayer may be extremely thin (its major role is to mechanically protect the Te surface and to act as a vapor barrier and may be supplied by any of a variety of means. For example, the slide may be dipped in a solution of polystyrene in INHIBISOL (trademark of Penetone, Tenafly, N.J.) and air dried to generate a film about 3400 Å thick.

Figure 7:
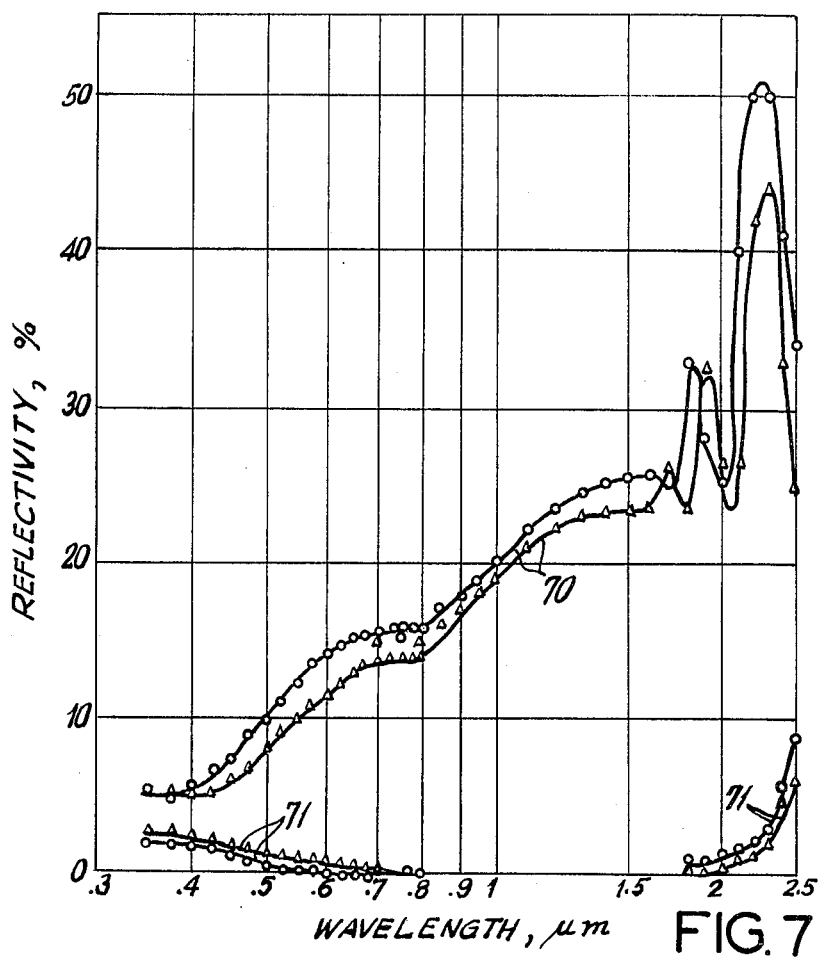
FIGS. 7 and 8, on coordinates of reflectivity and wavelength, are plots of the reflectivity manifested by the device shown in FIG. 6.

The total reflectivity is shown in FIG. 7, curves 70. The specular reflectivity (curves 71) is about 4%, with an additional 3% diffuse reflectivity at about 4400 Å. Flash melting of portions of the surface with a 0.1 μsec pulse of 60 mJ/cm² at 4400 Å leaves dots about as shiny as the smooth tellurium surface described above. The dots were too small to measure the reflection spectrum, however.

Figure 8:
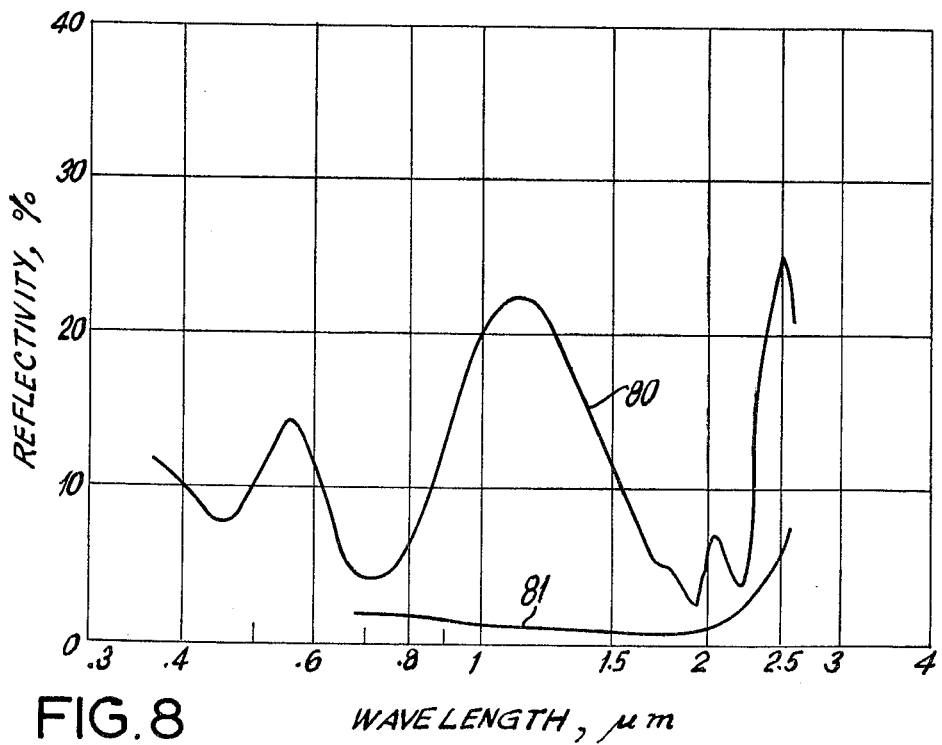

The dielectric layer also enhanced the contrast of the spots by acting as an anti-reflection film for the dark surface (FIG. 8). Curve 80 is the total reflectivity, while curve 81 is the diffuse reflectivity. The layer has little effect on the reflectivity of shiny spots. The preferred optical recording range is about 4500 to 7300 Å. Minimization of reflectivity for specific wavelengths by interference effects is achieved by using a layer thick enough to protect the reflecting film and of a thickness so that the minimum occurs at operating wavelengths. As can be seen in FIG. 8, the desired effect is achieved in the wavelength region of interest (about 0.45 μm—a convenient wavelength for Ar+ lasers).

Wavelengths used to record and read information may range in the IR, visible, UV and shorter. Present technology in information recording an retrieval in similar systems employed coherent radiation ranging from about 0.1 to 2.0 μm and accordingly is preferred.

EXAMPLES

Example 1

One side of a ⅛ inch thick fused silica plate was treated to produce a rough surface by employing particle track etching with 63 MeV $^{63}Cu^{8+}$ ions. The track density was about $10^{10}$ cm$^{-2}$. The surface was etched in 2.5 wt. % ammonium difluoride for about 8.5 min to produce overlapping conical holes about 1500 Å deep and about 1200 Å base diameter.

A tellurium film 8500 Å thick was vacuum evaporated onto the roughened surface at 140° C. so that the Te film coated the pores. The reflectivity of the quartz/Te interface is shown in FIG. 5. Included is the approximately 4% reflection from the front surface of the plate. At 4000 Å, the quartz/Te interface evidenced about 1% specular reflectivity (the reset of the reflectivity, about 4%, was from the air/quartz interface).

A polystyrene backing about 3400 Å thick, was then applied by dipping the plate into a solution of the polymer in INHIBISOL and drying in air. The polystyrene layer, which was optically transparent, served to protect the Te film from abrasion and oxidation.

The sample was irradiated from the front side by a flashlamp dye laser operating at a wavelength of 4400 Å with pulses of about 8 mJ with a half power length of 0.1 μsec. There was less than about 10% fluctuation in the pulse-to-pulse energy. The output beam from the laser was focussed with an AR-coated achromat having a focal length of about 6 inch. The lens-quartz plate distance was adjusted to alter the energy density incident on the slide.

The threshold for producing spots was about 64 mJ/cm²; the maximum tolerable energy for producing spots was about 450 mJ/cm². At that energy, the film was melted through completely, and resolidified as a haze of tiny metal beads. The spots were completely separated from the quartz surface, and were held in place by the polystyrene layer.

The contrast of spots so produced with background was very good, with the spots evidencing a reflectivity of 40–50% by visual comparison with a smooth Te surface. This was more than 10 times the reflectivity of the background.

EXAMPLE 2

On one side of an optically polished 1 in², ⅛ inch thick fused silica plate was vacuum evaporated a film of Te, 8500 Å thick. The vacuum evaporation was performed at 140° C., which upon examination in a scanning electron microscope, evidenced a microscopically rough surface which had a somewhat lower reflectivity than a perfectly smooth surface would have had. A polystyrene layer, 3400 Å, was applied to the metal film as in Example 1. The reflectivity of the Te/polystyrene interface is shown in FIG. 7. The sample was irradiated as in Example 1 except that the beam was incident on the polystyrene surface. The threshold for producing spots was about 40 mJ/cm². The polystyrene layer remained intact at least up to the point that the laser produced holes in the Te film. The polystyrene film could be used as an anti-reflection film (see FIG. 8) to increase the contrast of the spots by substantially reducing the reflectivity of the unirradiated background for selected wavelengths (curve 80, FIG. 8). The film also served to protect and stabilize the Te surface. The contrast of spots was about that obtained in Example 1.

What is claimed is:

1. An optical recording medium comprising a surface which is characterized as having cavities of average depth D and average spacing S such that for contemplated incident radiation of wavelength λ, S is less than about λ/20 and D is either greater than or less than about λ/6 and is capable of being selectively altered to either less than or greater than about λ/6, respectively, said altered surface having respectively decreased or increased reflectivity of said incident radiation therefrom.

2. The optical recording medium of claim 1 in which D is greater than about λ/6.

3. The optical recording medium of claim 1 in which D is less than about λ/6.

4. The optical recording medium of claim 1 in which λ ranges from about 0.1 to 2.0 μm.

5. The optical recording medium of claim 1 in which a substrate supports the reflecting material.

6. The optical recording medium of claim 1 in which an optically transparent layer, capable of substantial transparency to incident radiation, coats the surface of the reflecting material.

7. A process for recording information on an optical recording medium by exposing selected portions of the optical recording medium to an optical signal having a wavelength the optical recording medium comprising a surface characterized by cavities of average depth D and average spacing S such that for incident radiation of wavelength λ, S is less than about λ/20 and D is either greater than or less than about λ/6 prior to irradiation and either less than or greater than about λ/6, respectively, following irradiation wherein altering the average depth D to less than or greater than about λ/6 respectively increases or decreases the reflectivity of the exposed selected portions of the optical recording medium.

8. The process of claim 7 in which the reflecting material is formed on a supporting substrate.

9. The process of claim 7 in which an optically transparent layer coats the surface of the high reflectivity material.

10. The process of claim 7 in which the optical signal comprises coherent electromagnetic radiation.

11. The process of claim 7 in which the optical signal has a wavelength λ ranging from about 0.1 to 2.0 μm.

12. The process of claim 7 in which following exposure D is greater than 6/λ and the reflectivity of the surface in the exposed selected portions of said optical recording medium is reduced.

13. The process of claim 7 in which following exposure D is less than 6/λ and the reflectivity of the surface in the exposed selected portions of said optical recording medium is increased.

14. A process for fabricating an optical recording medium which comprises forming a graded, textured surface on a reflecting material characterized by cavities of average depth D and of average spacing S such that for contemplated incident radiation of wavelength λ, S is less than about λ/20 and D is either greater than or less than about λ/6 and is capable of being altered to either less than or greater than about λ/6, respectively.

15. The process of claim 14 in which the reflecting material is formed on a supporting substrate.

16. The process of claim 14 in which an optically transparent layer coats the surface of the high reflectivity material.

17. The process of claim 14 in which the cavities are formed by particle track etching which process comprises (a) bombarding a dielectric material with high energy particles, thereby generating damage tracks, and (b) etching said damage tracks to form cavities of average depth D and average spacing S.

18. The process of claim 14 in which the ratio of depth to spacing of the cavities is at least about 5.

19. The process of claim 14 in which the surface is bombarded with high energy particles having a particle density ranging from about $1 \times 10^{10}$ to $4 \times 10^{12}$ cm$^{-2}$.

* * * * *